J. HILL.
COMBINATION WEEDER AND TRANSPLANTER.
APPLICATION FILED AUG. 22, 1919.
1,356,146.
Patented Oct. 19, 1920.
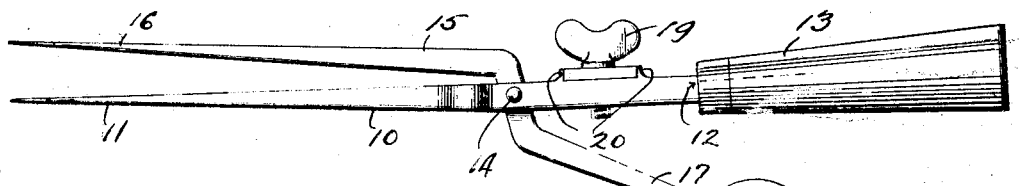
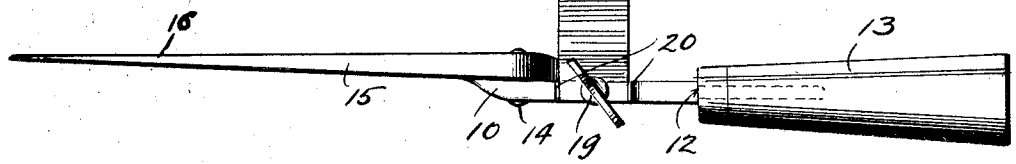
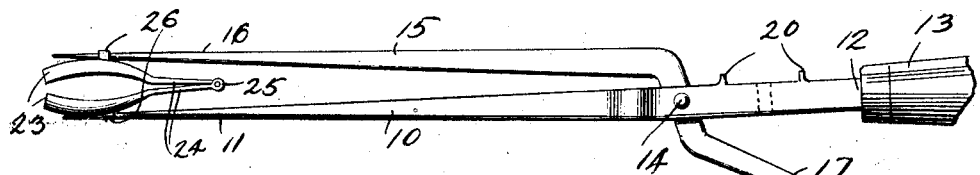
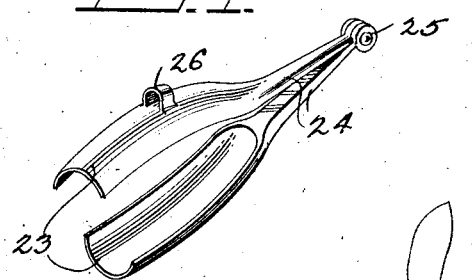
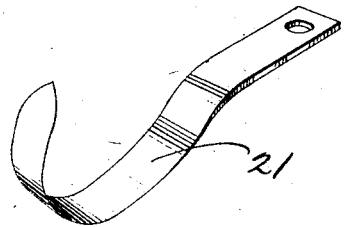
Inventor
J. Hill

UNITED STATES PATENT OFFICE.

JOSEPHUS HILL, OF TUNESASSA, NEW YORK.

COMBINATION WEEDER AND TRANSPLANTER.

1,356,146.     Specification of Letters Patent.     Patented Oct. 19, 1920.

Application filed August 22, 1919. Serial No. 319,185.

*To all whom it may concern:*

Be it known that I, JOSEPHUS HILL, a citizen of the United States, residing at Tunesassa, in the county of Cattaraugus, State of New York, have invented certain new and useful Improvements in Combination Weeders and Transplanters; and I do hereby declare the following to be a full, clear, and exact description of the invention, such as will enable others skilled in the art to which it appertains to make and use the same.

This invention relates to garden implements and more particularly to an improved device for removing weeds and taking up and transplanting small plants so that the dirt will be excavated therewith, thus preventing the plant from wilting when replanted.
The invention further comprises a weeder and transplanter having pivoted jaws one of which is provided with a handle and the other of which is provided with a finger receiving portion so as to permit actuation of the device to grip the weed or plant in holding, removing or planting the same, the device also having attachable thereto a weeding knife, a pruning knife and a transplanter device, constructed with a view to simplicity and facility of operation and being strong and durable and not likely to get out of working order.

With the above objects and others in view as will appear as the specification proceeds, the invention comprises certain novel combinations and arrangements of parts as will be hereinafter more particularly pointed out and claimed.

Reference is had to the accompanying drawings forming a part of this application, wherein like characters designate corresponding parts throughout the several views, in which—

Figure 1 is a side elevation of my improved weeder and transplanter,

Fig. 2 is an edge view,

Fig. 3 is a view of the device as a transplanter, and

Fig. 4 is a detailed view.
Fig. 5 is a perspective view of the weeder knife.

Referring to the drawings in detail, my improved implement is shown as comprising a straight shank 10 pointed as shown at 11 and having attached to its other end 12 a handle 13 by which it may be grasped or forced into the ground.

Pivoted to the shank 10 as at 14, intermediately of the ends of the shank, is a shank 15 which extends cross-wise and has a tapered portion 16 of the same length and coöperative with the tapered shank portion 11, while the opposite end thereof branches outwardly as shown at 17 and terminates in an open ring 18 designed to receive a finger or thumb in connection with the handle 13, so as to facilitate operation of the device whereby to permit the jaws or shank portions 11 and 16 to be moved toward each other for gripping a weed or plant in removing or resetting the same.

Attached to the shank 10 is a set screw 19 engaging a transverse threaded aperture therethrough with adjacent lugs 20 designed for securing a curved weeder knife 21 or a pruning knife 22 in position for use.

The transplanter is constructed with the parts as already described except the parts 21 and 22, but in addition, to the pointed extremities 11 and 16 respectively of the jaws or shanks are connected a pair of gouge-shaped blades 23 having extensions 24 hinged as shown at 25 to allow pivotal movement thereof to permit the blades 23 to be opened or closed for the purpose of penetrating the ground, gripping the plant with dirt clinging thereto without disturbing the roots and permitting the replanting or resetting of the plant without disturbing the plant or causing it to wilt. The connections between the jaws or tapered shank portions 11 and 16 with the blades 23 are shown at 26, said connections being made at the outer faces of said blades so that movement of the jaws will cause the blades to be spread up or moved to gripping position to effectively hold the weed or plant for removing the same or for resetting.

What is claimed is:—

1. A transplanter and weeder comprising a straight shank tapered at one end, a handle at the opposite end, a second shank pivoted thereto and having a portion extending cross-wise and a tapered end coöperative with the first-named end, the other extremity of the shank projecting outwardly and terminating in an open ring, the first-named shank being provided with spaced lugs forming a transverse recess, a set screw in this shank, and a knife having an aperture engaged by the screw and held by its shank portion between said lugs.

2. A transplanter and weeder comprising a straight shank tapered at one end, a handle at the oposite end, a second shank pivoted thereto and having a portion extending cross-wise and a tapered end coöperative with the first-named end, the other extremity of the shank projecting outwardly and terminating in an open ring, a set screw engaged through the first-named shank portion and a blade having a curved cutter edge detachably held by said screw.

3. A transplanter and weeder comprising a straight shank tapered at one end, a handle at the oposite end, a second shank pivoted thereto and having a portion extending cross-wise and a tapered end coöperative with the first-named end, the other extremity of the shank projecting outwardly and terminating in an open ring, arcuate jaw plates hinged together and means to connect said jaw plates to the extremities of the shanks for movement therewith.

4. The combination with pivoted jaws having gripping portions disposed in cross relation; of a pair of gouge-shaped blades disposed with their concaved sides toward each other and having their inner edges brought together and hinged, said blades being disposed at right angles to the jaws and means for mounting said blades on the jaws at the extremities thereof.

In testimony whereof, I affix my signature in the presence of two witnesses.

JOSEPHUS HILL.

Witnesses:
KENNETH A. WRIGHT,
GEO. MURRAY.